H. CARLTON.
AUTOMATIC VALVE.
APPLICATION FILED JUNE 3, 1910.
975,120.
Patented Nov. 8, 1910.
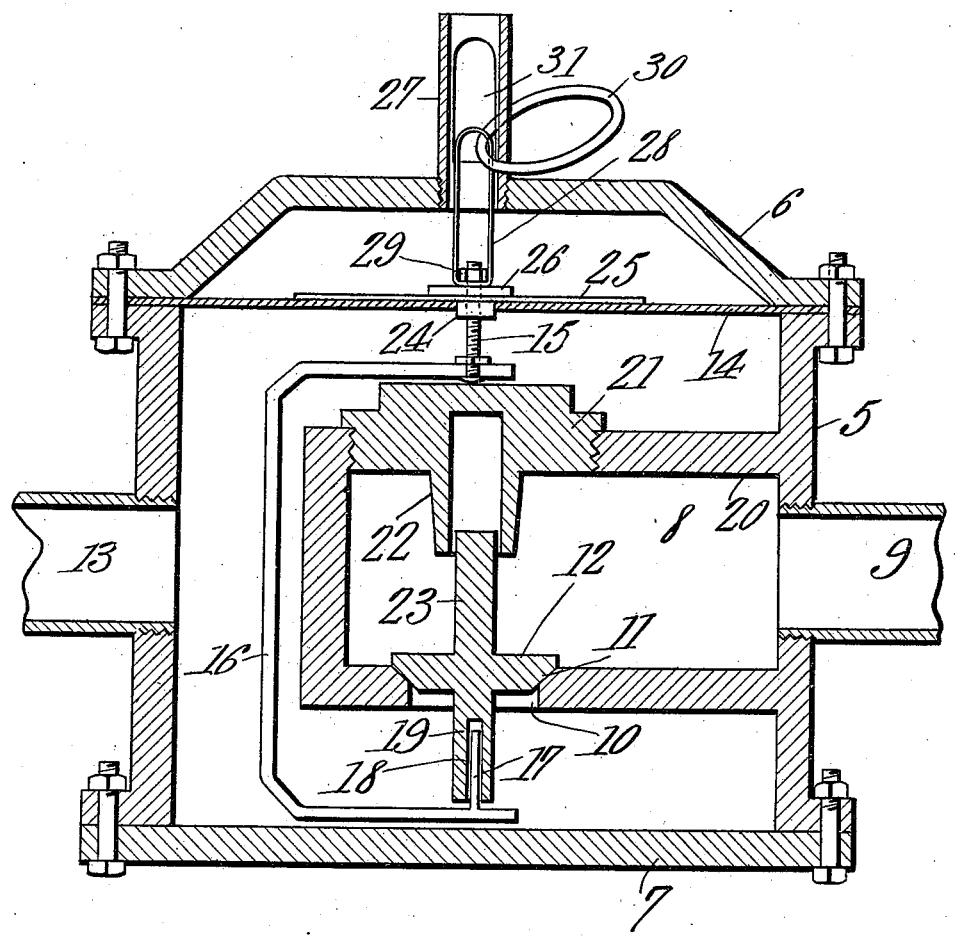
Witnesses
Harry Carlton,
Inventor
by C. A. Snow & Co.
Attorneys

UNITED STATES PATENT OFFICE.

HARRY CARLTON, OF SAPULPA, OKLAHOMA.

AUTOMATIC VALVE.

975,120.  Specification of Letters Patent.  Patented Nov. 8, 1910.

Application filed June 3, 1910. Serial No. 564,806.

*To all whom it may concern:*

Be it known that I, HARRY CARLTON, a citizen of the United States, residing at Sapulpa, in the county of Creek and State of Oklahoma, have invented a new and useful Automatic Valve, of which the following is a specification.

This invention has reference to automatic cut off devices which cut off the flow of a fluid by the pressure of the fluid itself, a valve being provided which is operated by a flexible diaphragm exposed to the pressure of the fluid.

The present invention is designed more particularly to be placed in a gas line, preferably between the meter and the house, its object being to close automatically if at any time, and from any cause, the pressure in the service line fails or becomes low enough to extinguish the flames at the gas burners in the house, and to so remain closed until opened manually, or until all burners or other openings in the house are properly closed.

It is the object of the invention to provide an automatic valve of the kind stated embodying certain novel features of construction to be hereinafter described and claimed, whereby its structure is simplified, and its operation is rendered more reliable and certain.

The invention is illustrated in the accompanying drawing in which a vertical section thereof is shown.

In the drawing, 5 denotes a cylindrical or other appropriately shaped casing, which is placed in upright position. The casing is closed by top and bottom heads 6 and 7, respectively, these heads being bolted or otherwise secured to the casing.

Within the interior of the casing 5, and closed thereto except as hereinafter provided, is a chamber 8 to which the inlet pipe 9 is connected. The bottom wall of the chamber 8 has an opening 10 into the interior of the casing 5, and this opening is formed with a valve seat 11. The valve for this seat is indicated at 12. Connected to the casing 5 is a gas outlet pipe 13. The gas enters the chamber 8 through the pipe 9, and flows into the interior of the casing 5 through the opening 10 when the valve 12 is opened, and thence passes out of the casing through the pipe 13. The pipe 9 is connected to the gas main, and the pipe 13 is connected to the service pipe of the house.

Within the casing 5 is located a flexible diaphragm 14, this diaphragm being operatively connected to the valve, and exposed to the gas pressure. The diaphragm is held in place between the top of the casing 5 and the head 6.

Carried by the diaphragm 14, at the center thereof, is a threaded stem 15, to the lower end of which is connected a yoke 16 extending around the chamber 8 on the outside thereof, and having at its lower end an upstanding stem 17 passing loosely into an opening 18 made in the lower end of a stem 19 extending from the bottom of the valve 12, and passing through the opening 10 into the interior of the casing 5. By reason of this connection between the diaphragm and the valve, it will be seen that the valve is unseated when the diaphragm is pressed upwardly by the pressure within the casing 5, and when said pressure drops, the diaphragm also drops and permits the valve to close.

The top wall 20 of the chamber 8 has a screw threaded opening which is closed by a screw plug 21, the inner end of which has a tubular extension 22 in which works a guide stem 23 extending from the top of the valve 12, whereby the valve is properly guided in its movement to open and closed position, and is prevented from becoming displayed laterally.

The connection between the stem 15 and the diaphragm 14 is made by means of nuts 24 screwed on said stem, on opposite sides of the diaphragm. Said stem, above the top nut 24, carries a disk 25, which disk is provided for the purpose of protecting the diaphragm. Above the disk, the stem carries a gasket 26, which is adapted to seat on the lower end of a short pipe 27 mounted on the head 6, and opening into the space above the diaphragm, and into the atmosphere.

The stem 15 also carries a lifting link 28, said link being clamped to the stem between the gasket 26 and a nut 29 screwed on the stem. The lifting link extends upwardly into the pipe 27, and carries a ring 30, this ring extending through slots 31 in the pipe. By reason of the loose connection between the yoke 16 and the valve 12, there is absolute freedom of movement of the working parts, and therefore no danger of the same sticking.

The space above the diaphragm 14 is in open communication with the atmosphere through the tube 27 except at such times when the pressure in the casing 5 under the diaphragm is sufficiently great to force the gasket 26 against the lower end of the pipe, whereupon it makes a tight joint while the diaphragm is under pressure, thus protecting the same in case of excessive pressure. The pipe 27 serves to protect and guide the lifting link 28, and also to relieve the space above the diaphragm of any pressure up to a certain limit, and it is of ample size to accomplish this. By the herein described arrangement of parts, the diaphragm 14 may be operated from the outside of the casing 5 to open the valve 12, this being effected by taking hold of the ring 30, and pulling upwardly thereon.

In operation, gas enters the chamber 8 in which it remains until the valve 12 is opened by lifting the diaphragm 14 by means of the ring 30 as already described. The valve now being open, the gas flows into the interior of the casing 5, and passes out of the same through the pipes 13. The pressure of the gas in the casing 5 sustains the diaphragm in a position to hold the valve 12 open, in which position it remains until the pressure in the line fails or drops, whereupon the pressure in the casing 5 is reduced, which permits the diaphragm to drop, and the valve 12 then drops to its seat by its own weight, where it stays, holding the gas shut off, until again opened manually.

The herein described device eliminates all danger of explosions and asphyxiation, and it will work equally as well on any kind of gas, air or even water.

What is claimed is:

1. The combination with a casing having an outlet, and a chamber having an inlet, and an opening into the casing; of a valve controlling said opening, an apertured stem extending from the valve into the casing, a flexible diaphragm in the casing, a yoke carried by the diaphragm, and a stem on the yoke extending loosely into the aperture of the valve stem.

2. The combination with a casing having an outlet, and a chamber having an inlet, and an opening into the casing; of a valve controlling the opening, a flexible diaphragm in the casing, one side of said diaphragm being exposed to the pressure in the casing, and said casing having a vent tube on the other side of the diaphragm, said tube being slotted, a link carried by the diaphragm, and extending into the tube, and a ring connected to said link and passing through the slots of the tube, and a connection between the diaphragm and the valve.

In testimony that I claim the foregoing as my own, I have hereto affixed my signature in the presence of two witnesses.

HARRY CARLTON.

Witnesses:
JOHN F. BRANDON,
R. M. McMAHAN.